A. WYLES, Jr.
SELF PROPELLED AGRICULTURAL IMPLEMENT.
APPLICATION FILED SEPT. 4, 1914. RENEWED OCT. 5, 1916.
1,204,225.
Patented Nov. 7, 1916.
5 SHEETS—SHEET 4.
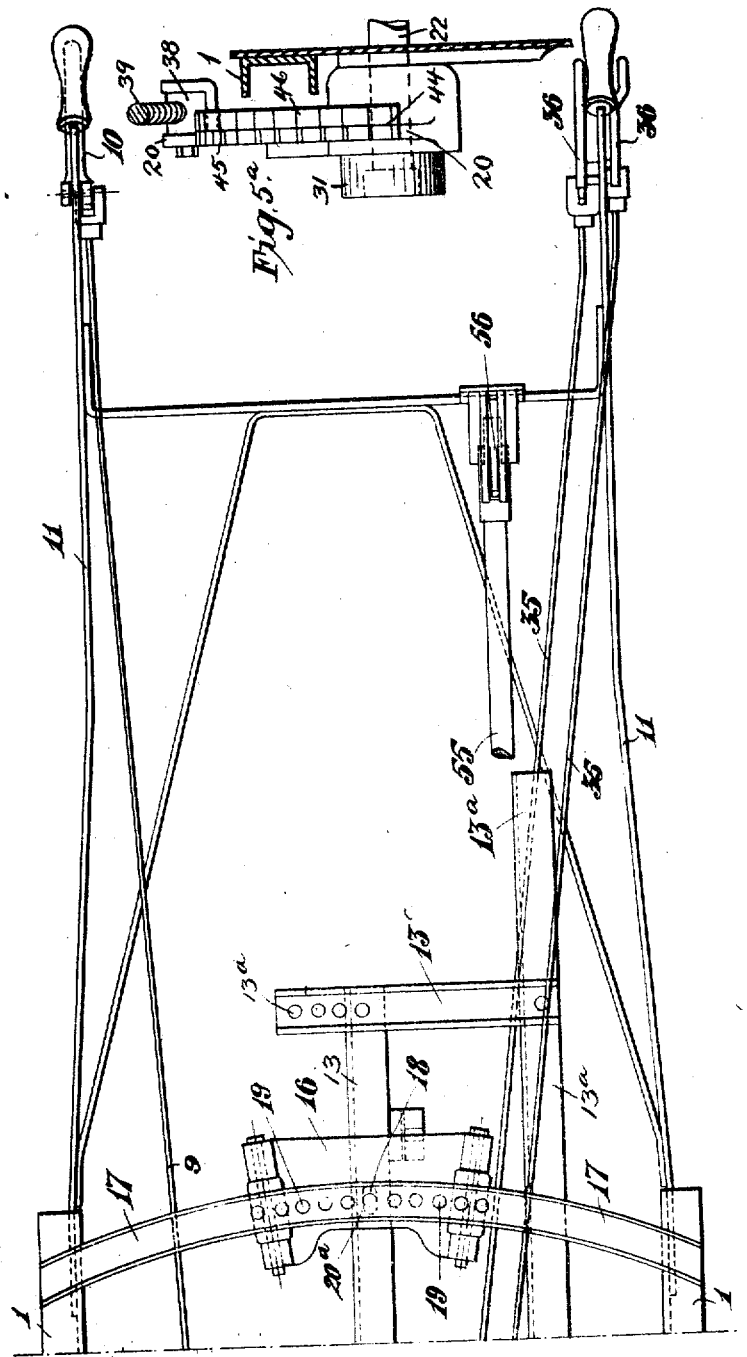
WITNESSES.
INVENTOR
ALBERT WYLES, JUNIOR
by
Attorney

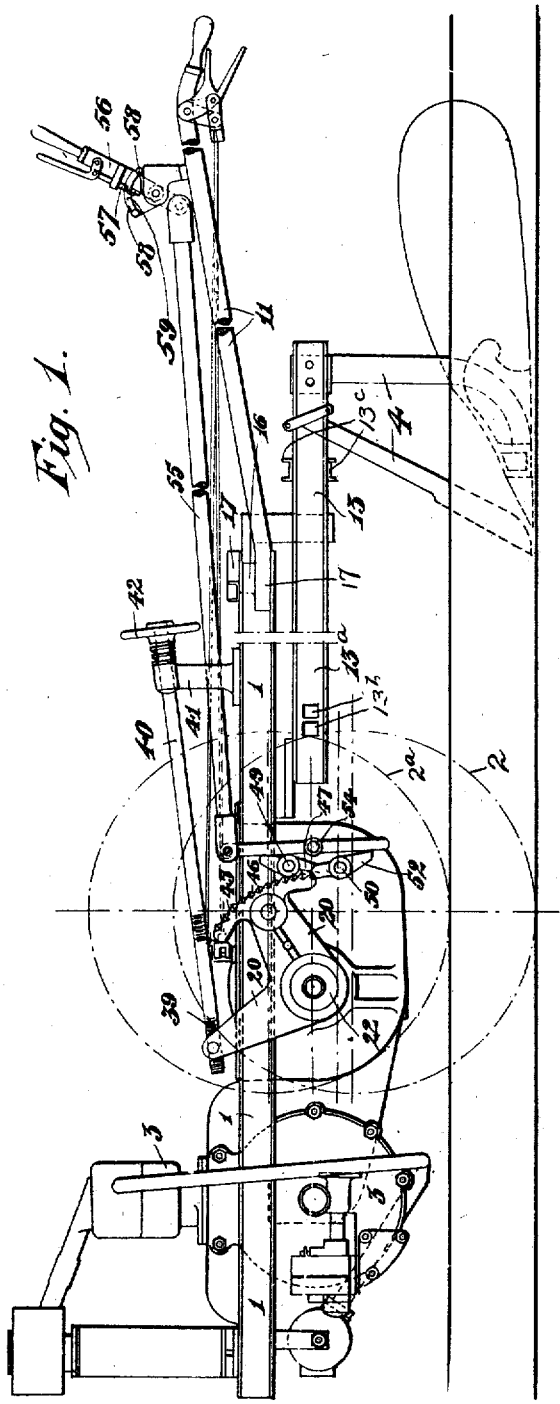

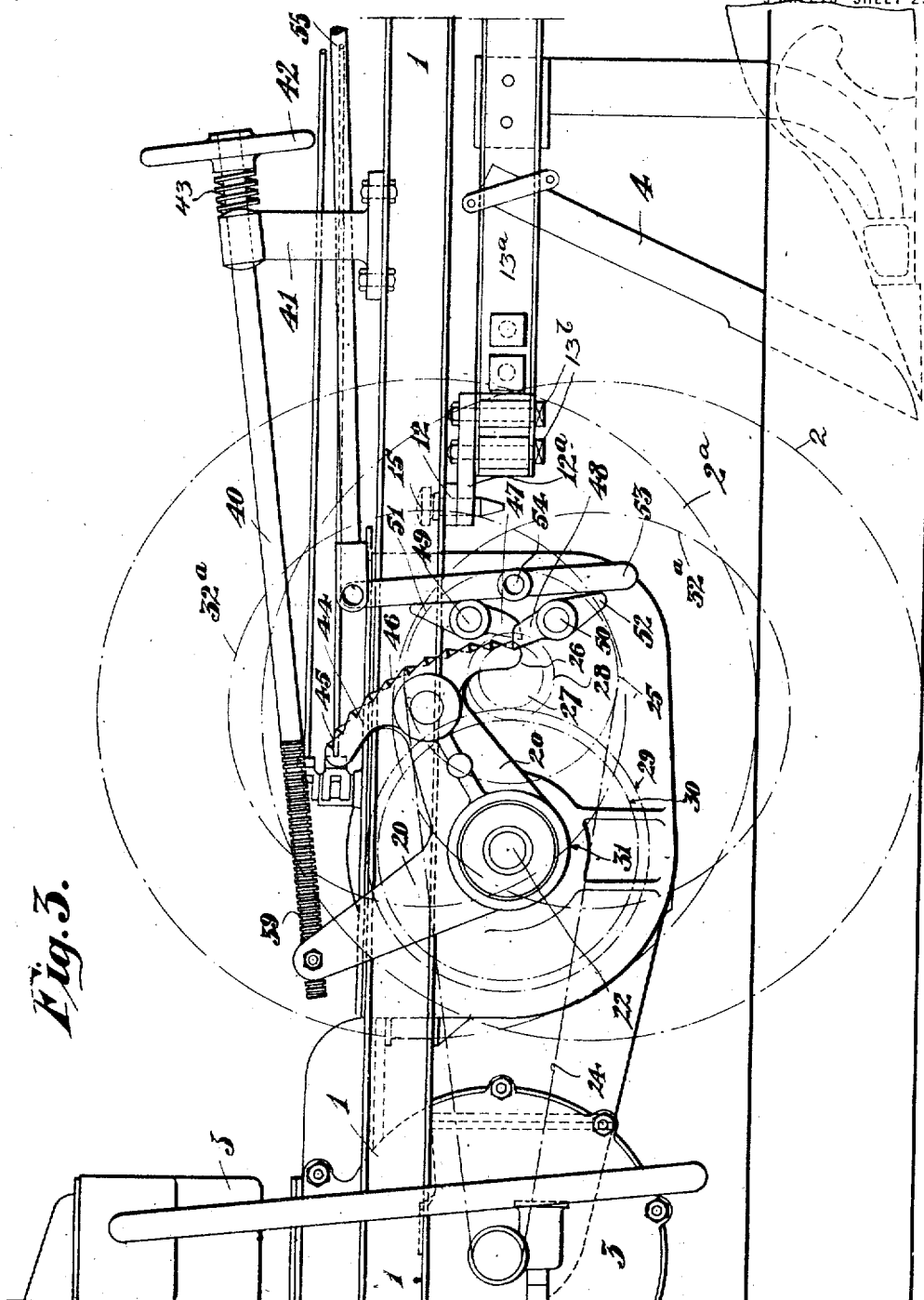

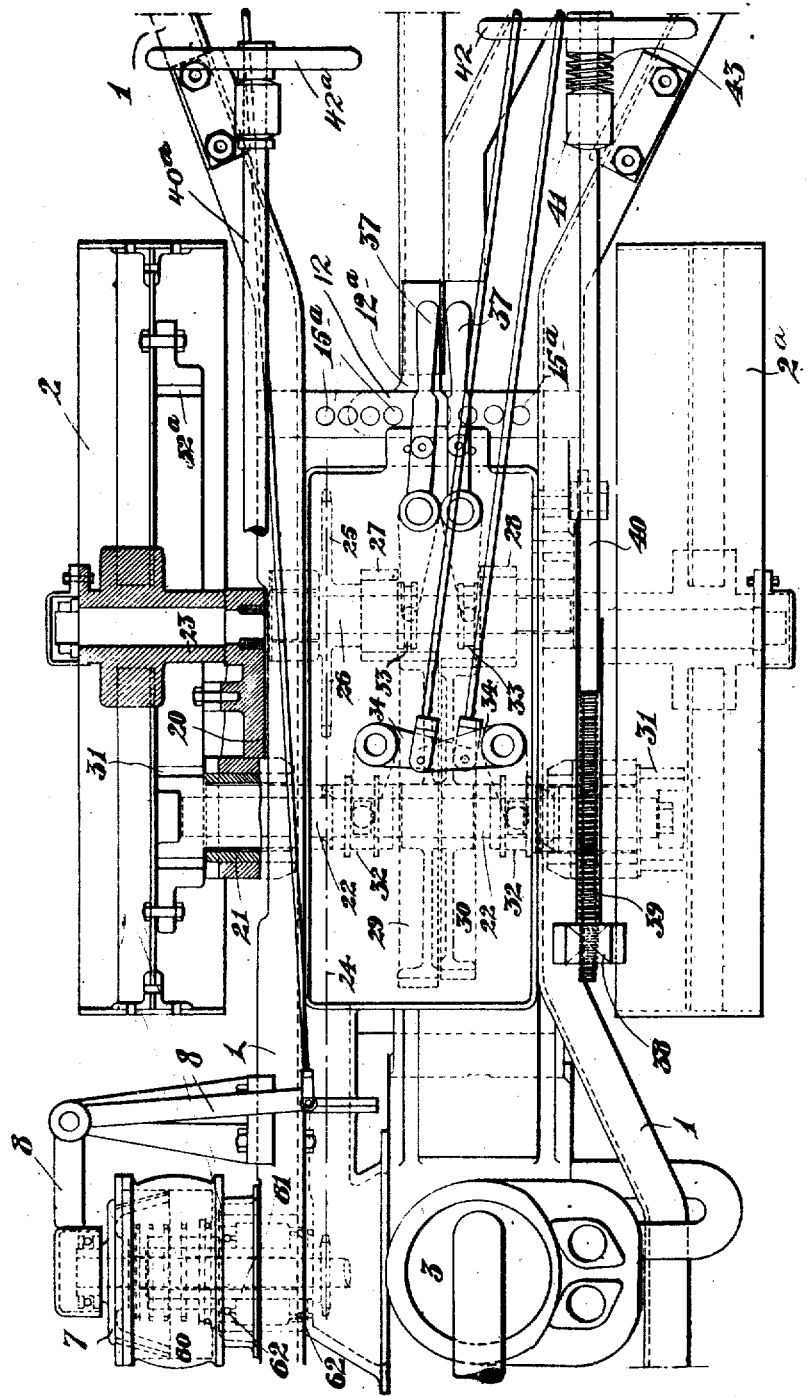

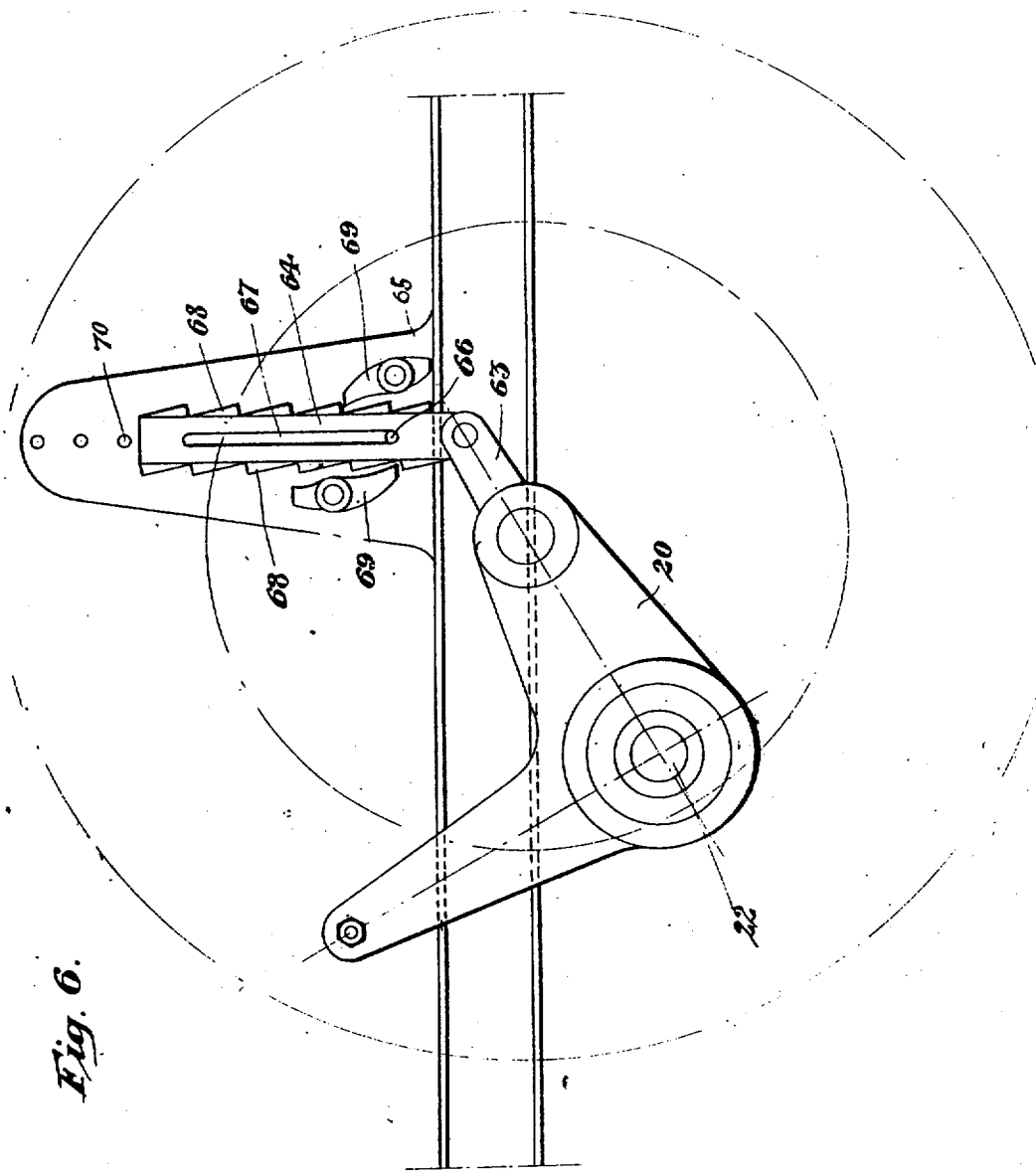

UNITED STATES PATENT OFFICE.

ALBERT WYLES, JR., OF LEEDS, ENGLAND.

SELF-PROPELLED AGRICULTURAL IMPLEMENT.

1,204,225.   Specification of Letters Patent.   Patented Nov. 7, 1916.

Application filed September 4, 1914, Serial No. 860,247. Renewed October 5, 1916. Serial No. 124,007.

*To all whom it may concern:*

Be it known that I, ALBERT WYLES, Jr., a subject of the King of England, residing at Leeds, in the county of York, in England, have invented certain new and useful Improvements in Self-Propelled Agricultural Implements, of which the following is a specification.

This invention relates to self-propelled agricultural implements, and comprises novel features and combinations of parts whereby many operations required in the art of cultivating may be carried out in an efficient and simple manner with a minimum of trouble on the part of operators and with low consumption of power.

The invention comprises novel means whereby one or other of the running wheels may be raised or lowered in relation to the frame, and means whereby the frame may be raised by the motor power through the transmission mechanism to the running wheels for the purpose of carrying out certain evolutions in tilling operations.

The invention is hereinafter fully described and the novel features thereof specifically pointed out in the appended claims, reference being made to the accompanying drawings, in which—

Figure 1 is a side elevation, and Fig. 2 a sectional plan view of an implement having the present improvements applied thereto. Fig. 3 is an enlarged side elevation of parts shown in Fig. 1. Fig. 4 is an enlarged sectional plan view of parts shown in Fig. 2. Fig. 5 is a further enlarged plan view of other parts shown in Fig. 2. Fig. 5ª is a detail view of a toothed segment hereinafter described. Fig. 6 is a detail view of a modification.

Referring to Figs. 1 to 5, 1 designates the main frame of the implement which is supported by two running wheels 2 2ª, forward of which is disposed the motor 3 which is so located as to substantially balance the weight of the frame and implements 4 carried thereby rearward of the wheels. The said motor is suitably of the internal combustion kind of any conventional or appropriate type and includes a clutch 7 shown as operated by means of bell crank lever 8, rod 9 and hand lever 10 carried by one of the handles 11, two of which are mounted at the rear of the frame 1 for controlling the implement by a man walking on the ground, although other means of control may be adopted.

Secured to the side members of the frame 1 is a transverse frame member 12, to which there is pivotally connected by means of a head 12ª a strong beam or frame consisting of two members 13, 13ª connected at their forward ends as by bolts 13ᵇ and at or adjacent their rear ends by two channel irons 13ᶜ, the latter being provided with holes 13ᵈ for passage of a connecting pin (not shown) to permit of lateral adjustment of the two parts 13, 13ª in which case the bolts 13ᵇ will be unscrewed and a filling piece inserted between the said two parts at this point. The beam thus constituted carries the tilling tool or tools 4 shown in the present example as plow shares secured to said beam in any conventional or approved manner. The head 12ª and consequently the beam is mounted on said transverse member 12 by means of a vertical or substantially vertical pivot 15 which is adapted to engage one of a series of apertures 15ª in the frame member 12, the pivot and consequently the beam being thus capable of lateral adjustment to vary the width of cut of the implement without altering the angle. Intermediate its ends the beam 13, 13ª is provided with an enlarged end or slide 16 and this slide moves between curved transverse guides 17. The beam 13, 13ª may thus be moved about its pivot 15 at any angle in relation to the plane of the running wheels 2, 2ª thus causing the tool or tools secured to said beam to coact with the ground when running in a furrow with the beam angularly adjusted to deflect the forward part of the implement including the running wheels and thus enable the implement to be steered.

The slide 16 is shown as provided at its center with a slot 18 and the guides 17 are provided with a number of apertures 19 through one of which may be passed a pin 20ª which is caused to engage the slot and thus hold the beam 13 13ª in place. The beam and tool or tools carried thereby may thus be secured at any angle within the range of the apertures 19, this method of securing the beam being adopted when not controlling the implement by hand, the implement then being capable of self-steering, attention only being required for turning at the end of a furrow. The fact that the handles 11 are attached to the main frame 1 carrying the motor and provided with the running wheels and not to the tool supporting beam shows that the former is the part which receives the steering movements and not the tool. Steering can thus be effected without moving the tool in the ground.

One or both of the running wheels 2 2ª of the implement is or are mounted for vertical adjustment relatively to the frame 1, the construction shown comprising a radial arm 20 of bell crank formation pivotally mounted on said frame by means of a boss 21 forming the bearing of a shaft 22, said arm having at its outer end a gudgeon 23 on which the wheel is mounted. The wheels are shown as driven from the motor 3 by mechanism comprising a chain 24 driving a sprocket wheel 25 on a counter shaft 26 on which is also mounted sliding pinions 27, 28 adapted to mesh with spur wheels 29, 30 carried by the shaft 22, this shaft being provided at each outer end with a driving pinion 31 which meshes with an internally toothed ring 32ª secured to the running wheel. It will thus be seen that the arm 20 is fulcrumed on the same axis as the driving pinion 31, thus enabling the wheel to be adjusted as to height in relation to the frame of the implement without affecting the driving transmission.

The shaft 22 is shown as provided with clutches 32 for giving a positive drive to both wheels and yet permitting either to overrun the other for steering purposes. Either of these clutches can be held out of gear by levers 34 and rods 35 carried to the rear of the implement and operable by hand levers 36. The sliding pinions 27, 28 are operated by means of levers 37 for controlling the speed through the gearing above described. As aforesaid, the arm 20 is in the form of a bell crank and the arm thereof which does not carry the running wheel is provided with a nut 38 with which engages the screw threaded end 39 of a rod 40 which extends rearward and traverses a bracket 41 carried by the main frame 1, the rod being provided at its outer end with a hand wheel 42 between which and the bracket may be disposed a buffer spring 43.

The wheel carrying arm of the lever 20 is enlarged to form a segment 44 having the pivotal axis 22 as its center, this segment being provided with two sets of ratchet teeth 45 and 46 disposed side by side and oppositely directed and with each of said sets of ratchet teeth there is adapted to engage a pawl 47 or 48 respectively mounted on spindles 49 and 50 suitably supported and having tails 51 and 52. The pawls are controlled so that only one of same can be in engagement with the ratchet teeth at once, the means shown for this purpose consisting of a lever 53 pivoted at 54 between the pawls and adapted to bear against the tails of said pawls, the lever being actuated by a rod 55 extending rearward and being under the control of the operator as by means of a hand lever 56 having a dog catch 57 engaging notches 58 in a quadrant 59, whereby the lever may be held in its positions of adjustment.

By the means described it will be seen that either of the levers 20 can be manually rotated about its pivot 22 to raise or lower either or both of the wheels relatively to the frame and thus to each other or in other words lower or raise the frame in relation to the ground and by suitably positioning the hand wheel 42 the limit of such raising or lowering can be varied at will, but in the working of the implement if the lever 20 were left free the weight of the implement would cause the frame to fall and the wheels to occupy the upper position shown in Fig. 1, but the extent of movement of the wheels can be controlled by said hand wheel 42 and connections to said lever 20, and when the engine 3 is in operation the force exerted by the transmission mechanism will, through the driving pinion 31 and internal ring 32ª on the wheel, cause each frame to rise and consequently bring the wheels into the lower position, shown in Fig. 1 and by manipulating the lever 53, the pawls 47 and 48 relatively to the wheel in question will be actuated to permit or prevent these movements as required by the operator.

In the example of a plow assuming the land wheel 2ª only provided with all the above described means of adjustment as shown, the furrow wheel 2 is in the lower position in the furrow and the land wheel is in its uppermost position or raised as far as the hand wheel 42 and parts controlled thereby will permit. The furrow wheel 2 is however provided with a spindle 40ª and hand wheel 42ª for manual adjustment only. At the end of the furrow it is necessary to bring said land wheel 2ª to the lower position to correspond more or less to the position of the furrow wheel 2 whereby the frame is lifted and the nose of the plow or plows removed from the ground. On reaching the end of the furrow the operator, by means of the lever 56, rod 55, and lever 53 disengages the pawl 48 from its ratchet teeth 45 and the engine power through the transmission mechanism as described raises the frame of the implement, whereupon the other pawl 47 will be engaged with its ratchet teeth 46 to hold the segment 40 and consequently the frame in this raised position. The nose of the plow is now clear of the ground and the headland can be negotiated. On entering the return furrow the last mentioned pawl 47 is disengaged and the engine being stopped (or one of the clutches 32 between the transmission and wheel disengaged) the frame of the implement falls by gravity to the desired depth of plowing determined by the degree of adjustment imparted by the hand wheel 42, shock being absorbed by the buffer spring 43. The land wheel 2ª thus returns to its raised position and the first mentioned pawl 48 is caused to reëngage its ratchet teeth 45 so that when the engine power is re-applied the parts are maintained in this position until said pawl is again released.

The principle above described of raising the implement frame by the engine power through the transmission mechanism to the running wheel or wheels holds good whether an internal ring and pinion as described or an external gear wheel and pinion are used, provided that said pinion is located in front of the wheel axis. If said pinion were disposed behind the wheel axis the pressure exerted by the intermeshing gearing would be in the wrong direction and it would be necessary to reverse the motor in order to raise the frame. The tools may thus be lifted to the surface of the ground on reaching the end of a furrow without stopping the implement and then by driving one ground wheel only by manipulating one or other of the clutches 32 the implement can be swung around upon the other wheel as a pivot.

The aforesaid clutch 7 may be arranged within and carries a pulley 60 by means of a sleeve 61 carried by ball bearings 62, said pulley being adapted to drive as by a belt all forms of farm machinery, such as chaff cutters, sheep shearers, pumps, hay elevators and the like. Two important effects are obtained by this construction, viz. all stress set up in the pull on the belt is entirely removed from the engine bearings and the belt drive is operated through the clutch.

Fig. 6 shows a modification in which the radial arm 20 mounted on the shaft 22 is provided with a link 63 which is connected to a slidable rack 64 guided on a bracket 65 mounted on the frame by means of a pin 66 on the bracket passing through a slot 67 in the rack. The said rack is provided on opposite sides with ratchet teeth 68 of opposite direction with each of which there is adapted to engage a pawl 69 pivoted to the bracket. The extent of movement of the rack is limited by means of a pin or the like adapted to be inserted in one of a series of holes 70 in the bracket.

What I claim as my invention and desire to secure by Letters Patent of the United States is:—

1. In a self-propelled agricultural implement the combination of a frame, a motor carried thereby, a road wheel driven by said motor and mounted for vertical adjustment in relation to the frame, and means whereby the force of the motor driving said wheel may at will be caused to automatically raise said frame relatively to said wheel by the reaction of the driving mechanism thereon.

2. In a self-propelled agricultural implement, the combination of a frame, a motor carried thereby, a road wheel driven by said motor and mounted for vertical adjustment in relation to the frame, transmission mechanism from the motor to said wheel so disposed as to exert a reactionary force on said wheel to raise the frame relatively thereto, and means to hold the frame in its raised or lowered positions of adjustment.

3. In a self-propelled agricultural implement, the combination of a frame, a motor carried thereby, a road wheel driven by said motor and mounted for vertical adjustment in relation to the frame, means whereby the force of the motor driving said wheel may at will be caused to automatically raise said frame relatively to said wheel by the reaction of the driving mechanism thereon, and adjustable means for determining the degree of relative movement between the frame and said road wheel.

4. In a self-propelled agricultural implement, the combination of a frame, a motor carried thereby, a road wheel driven by said motor and mounted for vertical adjustment in relation to the frame, transmission mechanism from the motor to said wheel so disposed as to exert a reactionary force on said wheel to raise the frame relatively thereto, means to hold the frame in its raised or lowered positions of adjustment, and adjustable means for determining the degree of relative movement between the frame and said road wheel.

5. A self-propelled agricultural implement comprising a frame, a motor carried thereby, a road wheel mounted for movement relatively to said frame in a vertical direction, transmission mechanism from said motor to said wheel including intermeshing gearing adapted to exert a lifting effort on the frame, an adjustable stop for limiting the degree of movement of the wheel in relation to the frame, and means to hold the frame in its raised or lowered position.

6. In a self-propelled agricultural implement, a road wheel, an angularly movable lever supporting said wheel at the free end of said lever, an adjustable stop adapted to limit the angular movement of said lever, ratchet teeth of opposite direction disposed at the free end of said lever, and pawls coacting with said ratchet teeth to maintain said arm in its positions of angular adjustment.

7. A self-propelled agricultural implement comprising a frame, a motor carried thereby, a road wheel mounted for movement relatively to said frame in a vertical direction, transmission mechanism from said motor to said wheel including intermeshing gearing adapted to exert a lifting effort on the frame, an adjustable stop for limiting the degree of movement of the wheel in relation to the frame, means to hold the frame in its raised or lowered position, and means permitting engagement of only one pawl at a time with its respective ratchet teeth.

8. In a self propelled agricultural implement, a road wheel, an angularly movable lever supporting said wheel at the free end of said lever, an adjustable stop adapted to limit the angular movement of said lever, ratchet teeth of opposite direction disposed at the free end of said lever, pawls co-acting with said ratchet teeth to maintain said arm in its positions of angular adjustment and means permitting engagement of only one pawl at a time with its respective ratchet teeth.

In witness whereof I have signed this specification in the presence of two witnesses.

ALBERT WYLES, Jr.

Witnesses:
ERNALD SIMPSON MOSELEY,
MALCOLM SMEDHURST.